United States Patent
Reuter et al.

(10) Patent No.: US 7,475,952 B2
(45) Date of Patent: Jan. 13, 2009

(54) BRAKING SYSTEM WITH MECHANICAL COMBINATION VALVES

(75) Inventors: David F. Reuter, Beavercreek, OH (US); Daniel N. Borgemenke, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 187 days.

(21) Appl. No.: 11/111,091

(22) Filed: Apr. 21, 2005

(65) Prior Publication Data

US 2006/0238021 A1    Oct. 26, 2006

(51) Int. Cl.
*B60T 8/38* (2006.01)
(52) U.S. Cl. .................... 303/117.1; 303/116.2
(58) Field of Classification Search ............. 303/119.2, 303/117.1, 116.2, 116.1, 139, 140, 146, DIG. 10, 303/DIG. 11; 192/48.6, 105 BB, 41 S, 81 C
See application file for complete search history.

(56) References Cited

U.S. PATENT DOCUMENTS

| | | | | |
|---|---|---|---|---|
| 3,905,653 A | * | 9/1975 | Muller et al. | 303/119.2 |
| 3,926,286 A | * | 12/1975 | Johnson | 192/41 S |
| 4,520,914 A | * | 6/1985 | Kagiyama et al. | 192/71 |
| 4,838,622 A | * | 6/1989 | Kircher et al. | 303/113.2 |
| 4,957,331 A | * | 9/1990 | Burton et al. | 303/115.2 |
| 5,147,116 A | * | 9/1992 | Parker et al. | 303/115.2 |
| 5,188,436 A | * | 2/1993 | Devall | 303/113.2 |
| 5,211,455 A | * | 5/1993 | Matouka et al. | 303/115.2 |
| 5,499,865 A | * | 3/1996 | Katagiri et al. | 303/115.2 |
| 5,711,582 A | * | 1/1998 | Koike | 303/11 |
| 5,727,851 A | * | 3/1998 | Ohkubo et al. | 303/117.1 |
| 5,855,417 A | * | 1/1999 | Johnston et al. | 303/3 |

* cited by examiner

*Primary Examiner*—Robert A Siconolfi
*Assistant Examiner*—Vu Q Nguyen
(74) *Attorney, Agent, or Firm*—Thomas N. Twomey

(57) ABSTRACT

A hydraulic control system for a brake apparatus includes a combination valve and a motor connected to the combination valve. Output by the motor in a first direction places the combination valve in a first configuration, and output by the motor in a second direction opposite the first direction places the combination valve in a second configuration different from the first configuration. In the first configuration, the control valve allows hydraulic fluid to flow along a first fluid path. In the second configuration, the control valve allows hydraulic fluid to flow along a second fluid path different from the first fluid path.

14 Claims, 10 Drawing Sheets

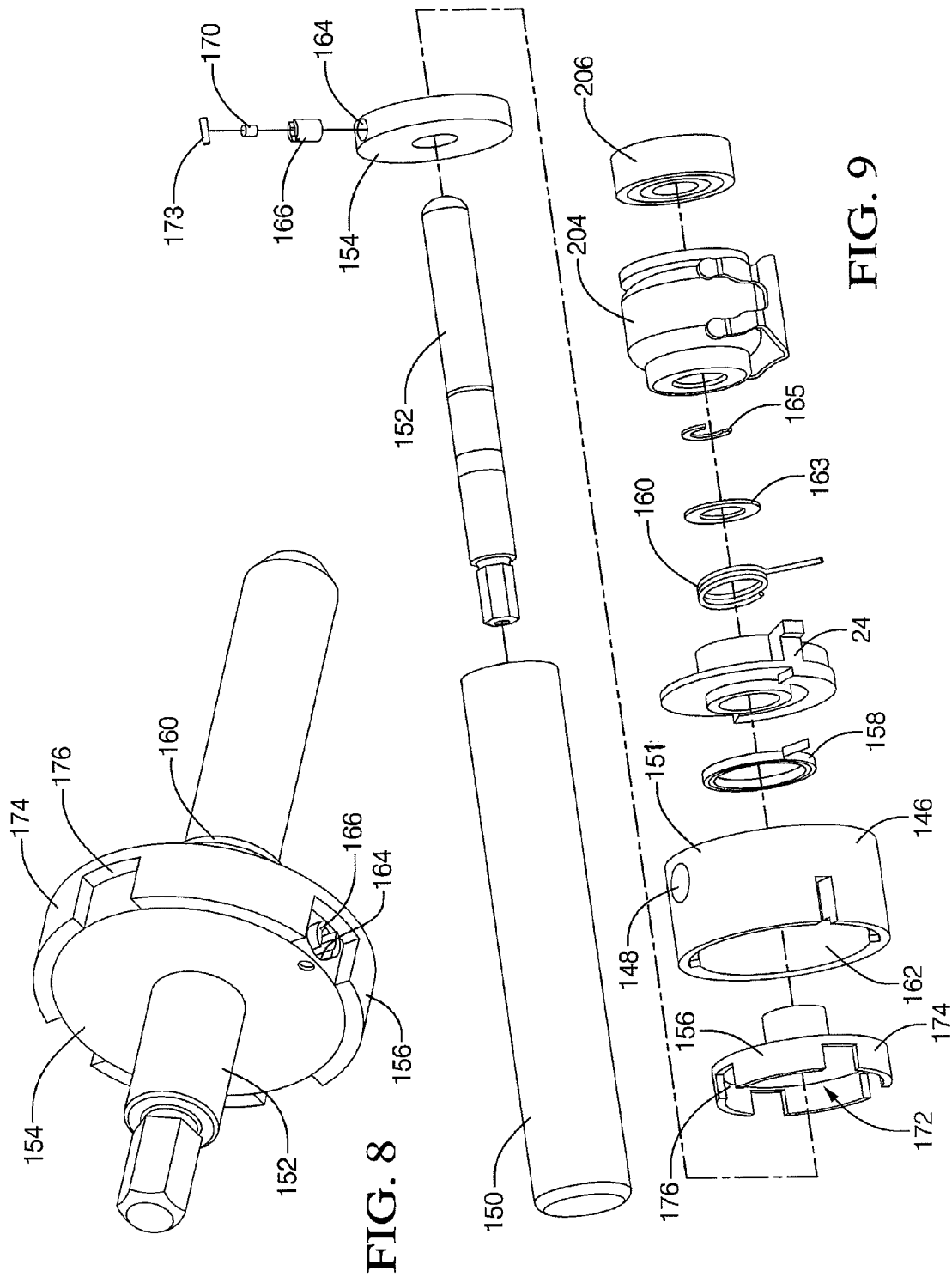

BRAKING SYSTEM WITH MECHANICAL COMBINATION VALVES

TECHNICAL FIELD

The present application relates generally to hydraulic control units for use in controlling braking systems, and more particularly to a hydraulic control unit including a mechanically actuated combination valve.

BACKGROUND

Since the mid 1930s, vehicles such as automobiles and light trucks have predominantly utilized hydraulic brake systems having a pedal-operated master cylinder supplying pressurized hydraulic fluid to disk or drum braking devices at each wheel. Early hydraulic brake systems utilized a single hydraulic fluid circuit supplying pressurized fluid from the master cylinder to all four wheels of the vehicle. A break in the fluid circuit anywhere rendered the entire hydraulic brake system inoperative.

In order to prevent a total loss of vehicle hydraulic braking in the event of a failure of part of the system, failsafe hydraulic split brake systems were developed that provided two separate fluid circuits from the master cylinder, configured such that a failure of either of the two fluid circuits would still leave hydraulic brakes operative on at least two wheels of the vehicle. In rear wheel drive automobiles and light trucks, one fluid circuit typically served the front wheels and the other fluid circuit served the rear wheels to provide a front/rear (F/R) failsafe hydraulic split system. Front wheel drive vehicles typically used a diagonal failsafe hydraulic split system, having one front wheel and the diagonally opposite rear wheel of the vehicle on one fluid circuit, and the other front wheel and its diagonally opposite rear wheel on the second fluid circuit. Government stopping distance regulations were passed for failed brake system performance that required brake systems to be configured such that a single failure of the braking system would still leave the brakes on at least two wheels of the vehicle operational.

In the years since hydraulic brake systems became the norm, many additional features have been added to further enhance safe operation and optimize vehicle performance. Modern brake systems often include a booster that amplifies force exerted on the brake pedal to provide power brakes that allow actuation with significantly less force applied to the brake pedal than required for a non-boosted brake system. Anti-lock brake systems (ABS) were developed in which valves controlling fluid flow to each wheel of the vehicle were pulsed, in response to signals received from rotation sensors monitoring each wheel, to preclude locking the brakes on slippery road surfaces. Traction control systems (TCS) were added that controlled both the brakes and the engine throttle setting to improve traction and handling of the vehicle during maneuvers, such as acceleration or turning, when the brakes are not being applied by the operator. Vehicle dynamics control (VDC) further advanced the level of sophistication of brake systems to utilize a number of sensors throughout the vehicle, and a more advanced onboard computer with higher throughput to monitor forces acting on the vehicle, together with inputs indicating operational commands from the operator applied to the steering, braking, and drive systems. VDC analyzes the data received from the sensors and coordinates operation of the various elements of the vehicle brake system, power-train, and, in some cases, suspension to provide enhanced vehicle safety or performance of the vehicle.

The addition of these enhancements has made hydraulic brake systems very complex. Numerous valves, sensors, and electronic control components are required. Brake systems offering one or more types of automated control operating modes, such as ABS, TCS and VDC, are known as "controlled braking systems."

SUMMARY

In an aspect, a hydraulic control system for a brake apparatus includes a combination valve and a motor connected to the combination valve. Output by the motor in a first direction places the combination valve in a first configuration, and output by the motor in a second direction opposite the first direction places the combination valve in a second configuration different from the first configuration. In the first configuration, the control valve allows hydraulic fluid to flow along a first fluid path. In the second configuration, the control valve allows hydraulic fluid to flow along a second fluid path different from the first fluid path.

In another aspect, a hydraulic control system for a brake apparatus includes a combination valve, a motor mechanically connected to the combination valve and a braking pump operatively connected to the motor for driving the braking pump. The motor positions the combination valve between a first configuration and a second configuration different from the first configuration. In the first configuration, the combination valve allows hydraulic fluid to flow along a first fluid path. In the second configuration, the combination valve allows hydraulic fluid to flow along a second fluid path toward the pump, where the second fluid path is different from the first fluid path.

In another aspect, a method of controlling a braking apparatus having a pressure modulation mode and a pressure build mode is provided. The method includes linking a reversible motor to a mechanical actuation valve and actuating the mechanical combination valve using the reversible motor from a first configuration associated with a first motor output direction to a second configuration associated with a second motor output direction opposite the first motor output direction, where the second configuration is different than the first configuration.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 7 and 8 are perspective views of parts of the slip clutch assembly of FIG. 6;

FIG. 9 is an exploded, perspective view of the slip clutch assembly of FIG. 6;

DETAILED DESCRIPTION

Figure 1:
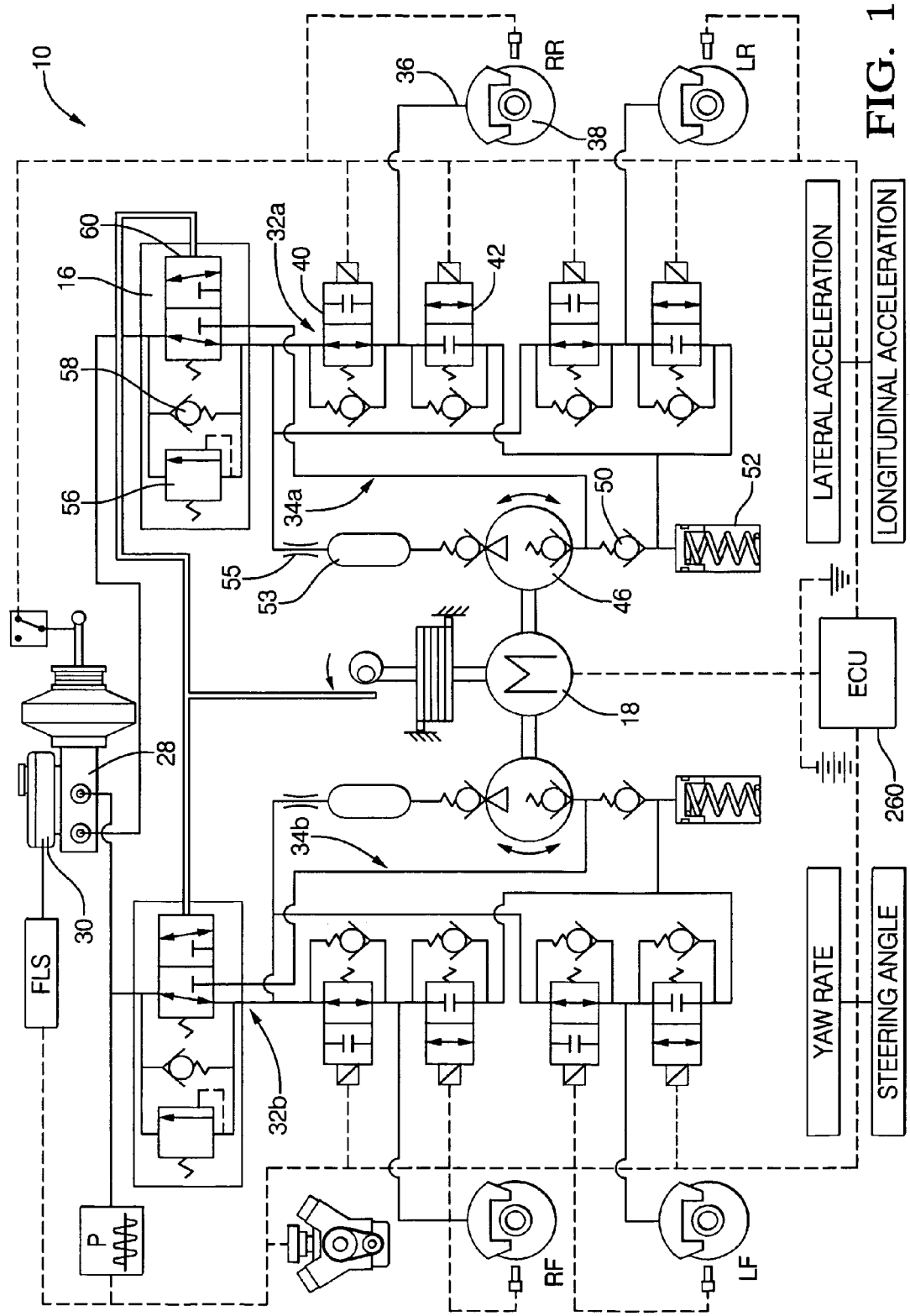
FIG. 1 is a schematic of an embodiment of a valve/motor assembly of a controlled braking system of the present invention.

Referring to FIG. 1, a controlled braking system, generally designated 10, has a control unit 11 that may include a pressure modulation mode 12, a pressure build mode 14 and a mechanically actuated combination valve 16 (MCV) for use in controlling activation and deactivation of the pressure modulation and pressure build modes, depending on a configuration of the combination valve 16. The combination valve 16 is positioned to these configurations by an actuator such as a reversible motor 18 operatively connected to the combination valve. Mechanical connections 20 interconnecting the motor 18 and the combination valve 16 may include a clutch assembly 22, a cam 24 and mechanical linkages 26. As will be described in greater detail below, depending on the direction of the output of the motor 18, the combination valve is in either a first configuration (e.g., when the motor's output is in a first direction) that activates the pressure modulation mode 12 or in a second configuration (e.g., when the motor's output is in a second direction different from the first direction) that activates the pressure build mode 14. As used herein, "pressure modulation mode" refers to a mode where braking pressure is modulated up to the maximum pressure supplied by a driver's input, such as an anti-lock braking operation, and "pressure build mode" refers to a mode where the control unit 11 itself provides the hydraulic braking pressure that is subsequently used for controlled braking operations, such as traction control or vehicle dynamics control.

Figure 2:
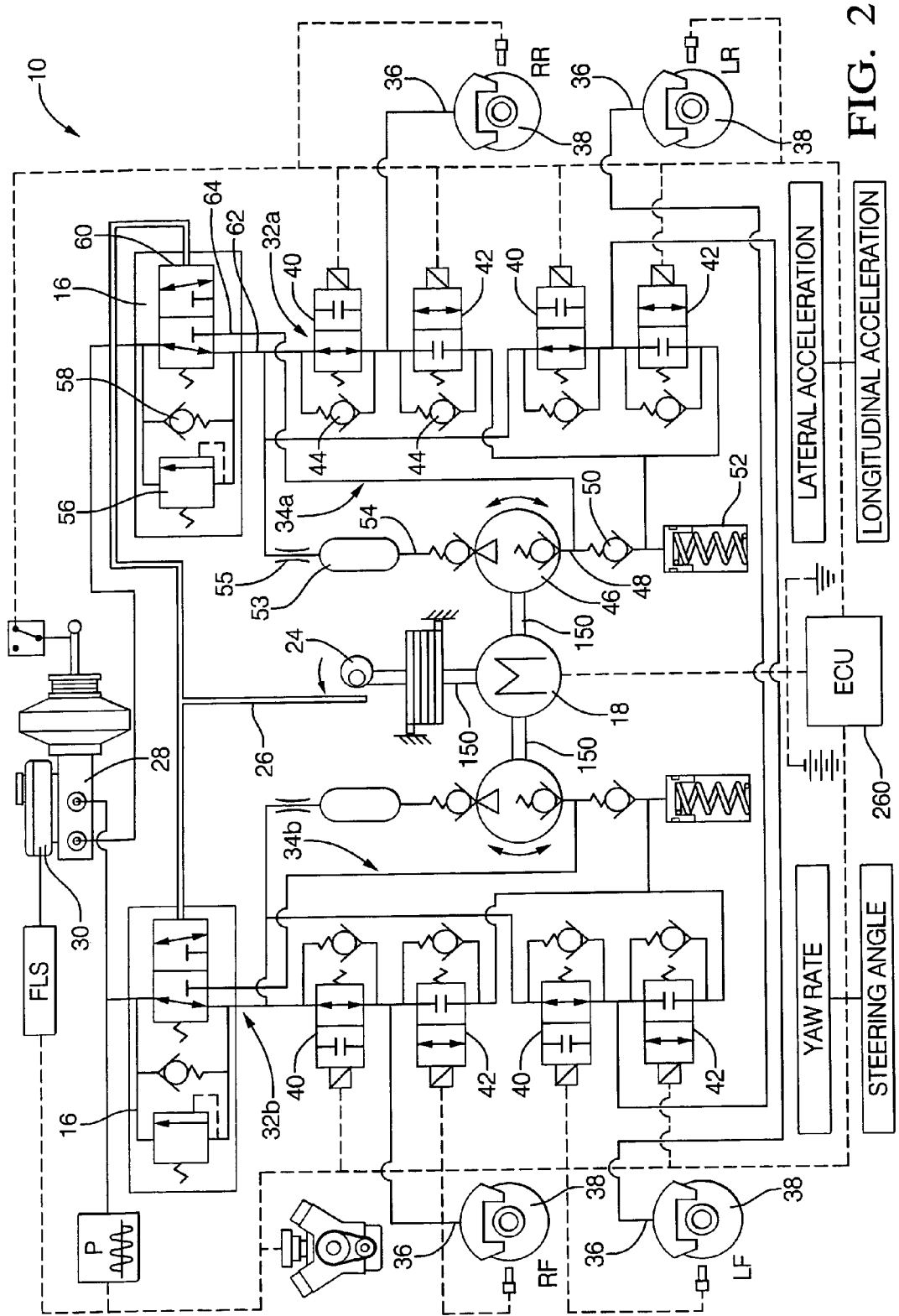
FIG. 2 is a schematic of an embodiment of a controlled braking system of the present invention having a diagonal split configuration.

Referring now to FIG. 2, the controlled braking system 10 may include a master cylinder 28 connected to each of a fluid reservoir 30, primary brake circuits, generally designated 32a, 32b, and pressure build brake circuits, generally designated 34a, 34b. Mechanically actuated combination valves 16 control hydraulic fluid flow from the master cylinder 28 to the primary brake circuits 32a, 32b and the pressure build brake circuits 34a and 34b.

The primary brake circuits 32a and 32b preferably form a diagonal hydraulic split braking system. For example, primary brake circuit 32a may control left front braking (LF) and right rear braking (RR) while primary braking circuit 32b may control right front braking (RF) and left rear braking (LR) by directing hydraulic fluid at braking pressure to an inlet/outlet 36 of respective hydraulically actuated braking devices 38 and receiving a return flow of hydraulic fluid from inlet/outlet 36 of the braking devices 38. For simplicity, because the components of the primary braking circuits preferably are identical, only the components of primary braking circuit 32a and pressure build brake circuit 34a will be described.

Primary braking circuit 32a preferably includes a normally open inlet control valve 40 and a normally closed outlet control valve 42 for controlling fluid flow in and out of each of the right rear (RR) and left front (LF) braking devices 38. The control valves 40, 42 may be electrically actuated (for example, solenoid valves), e.g., by an electric signal generated by electronic control unit 260. Each of the control valves 40, 42 also has associated therewith a check valve 44 allowing reverse flow in a direction toward the master cylinder 28 when the associated control valve 40, 42 is in the closed position.

Pressure build brake circuit 34a includes a controlled braking pump 46 having an inlet 48 operatively connected through a check valve 50 for receiving hydraulic fluid from the fluid reservoir 30. An accumulator 52 may be connected to both the primary braking circuit 32a and the check valve 50. The accumulator 52 stores hydraulic fluid received from the primary braking circuit 32a and delivers stored hydraulic fluid through the check valve 50 to the inlet 48 of the controlled braking pump 46. The controlled braking pump 46 also may include an outlet 54 operatively connected through a damper 53 and an orifice 55 for providing pressurized hydraulic fluid to the primary braking circuit 32a at braking pressure. The controlled braking pump 46 may be driven by reversible motor 18.

Combination valve 16 controls fluid flow alternately to the primary braking circuit 32a or the pressure build brake circuit 34a. Combination valve 16 provides flow regulation structure 60 capable of switching hydraulic fluid flow between an inlet 62 of the primary braking circuit 32a and an inlet 64 of the pressure build brake circuit 34a, pressure release structure 56, for allowing pressurized hydraulic fluid to flow from the primary braking circuit 32a toward the master cylinder 28 under certain pressure conditions, and directional flow structure 58 for allowing hydraulic fluid to flow from the master cylinder 28 to the primary braking circuit 32a under certain conditions such as when high flow rates are needed during a panic break apply.

Figure 3:
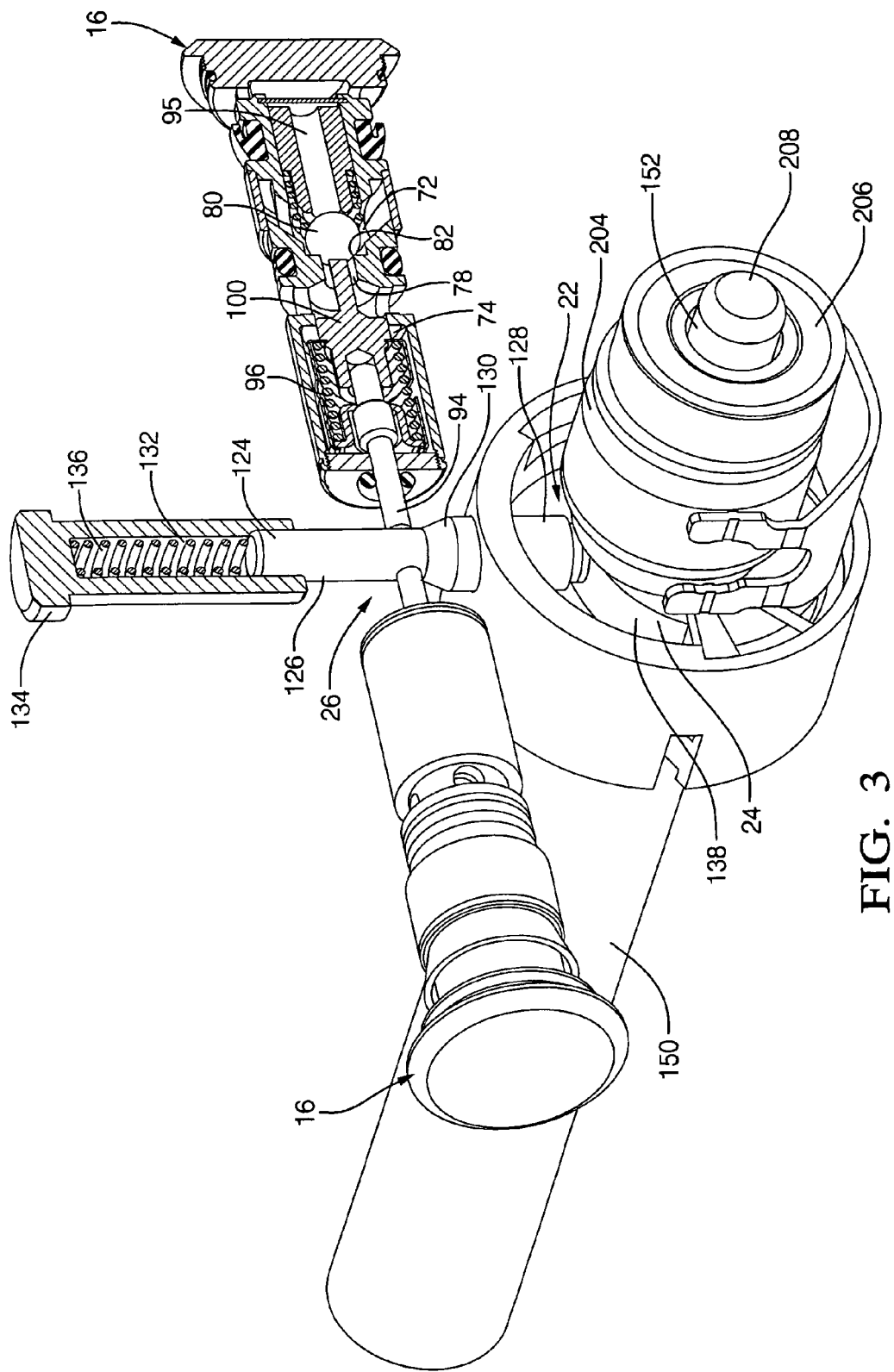
FIG. 3 is a perspective view, partially in section, of an embodiment of the combination valve/motor assembly of FIG. 1.

As shown in FIG. 3, combination valves 16 are preferably mechanically linked to motor shaft 150 by cam 24, clutch assembly 22 and mechanical linkages 26 including a lift pin 124 and actuator pin 94. Also connected to motor shaft 150 is an eccentric pump actuation member 204 that provides for pump actuation regardless of the direction of the motor's output. A pilot bearing 206 may be connected to a clutch main shaft 152 at an end 208 opposite the motor shaft 150.

Figure 4:
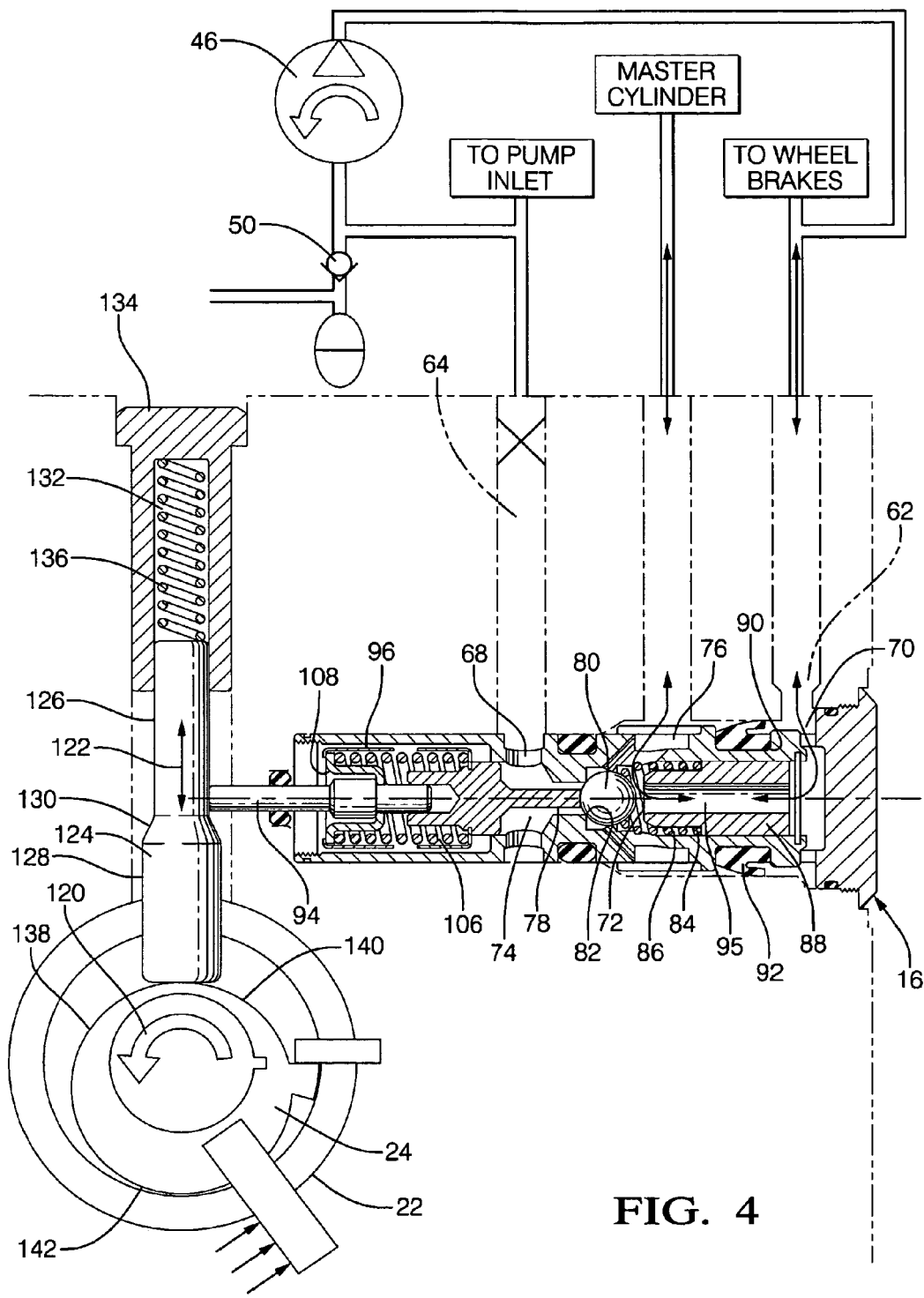
FIGS. 4 and 5 are elevational views of the combination valve/motor assembly of FIG. 3 in de-energized and energized states, respectively.

FIGS. 3 and 4 illustrate the configuration of combination valve 16 with the braking system 10 in pressure modulation mode (i.e., with the combination valve 16 directing fluid flow to inlet 62 of the primary braking circuit 32a (see FIG. 2) while blocking fluid flow to the inlet 64 of the pressure build circuit 34a). Referring particularly to FIG. 4, combination valve 16 has a primary bore 72, a secondary bore 74, a first port 68 for providing communication between the secondary bore 74 and the inlet 64 of the pressure build brake circuit 34a, a second port 76 for providing communication between the primary bore 72 and the master cylinder 28 (see FIG. 2) and a third port 70 for providing communication between the primary bore 72 and the inlet 62 of the primary braking circuit 32a. The primary and secondary bores 72, 74 are capable of communication with each other through passageway 78.

Combination valve 16 includes a sealing member 80 to seal the passageway 78 during pressure modulation mode 12. As shown, the sealing member 80 may be a ball capable of sealing passageway 78 by seating against first valve seat 82. The sealing member 80 is biased toward first valve seat 82 by a primary spring 84 that is seated within a recess 86 formed between an inner primary bore member 88 having an aperture 95 extending therethrough and an outer primary bore member 90 disposed coaxially about the inner primary bore member.

A lip seal 92 is disposed about the outer primary bore member 90, which provides the check valve function (see element 58 of FIG. 2).

As illustrated by FIG. 4, the combination valve 16 allows hydraulic fluid to flow from the master cylinder 28 (see FIG. 2) through the primary bore 72 and into the primary braking circuit 32a (see FIG. 2) through inlet 62, e.g., for controlled braking, such as an anti-lock braking operation. To deactivate pressure modulation mode 12 and activate pressure build mode 14, the sealing member 80 is forced apart from the first valve seat 82 to open the passageway 78 by extending an actuator pin 94 and an axially collapsible spring cage assembly 96 connected thereto in a direction toward the inner primary bore member 88.

Figure 5:
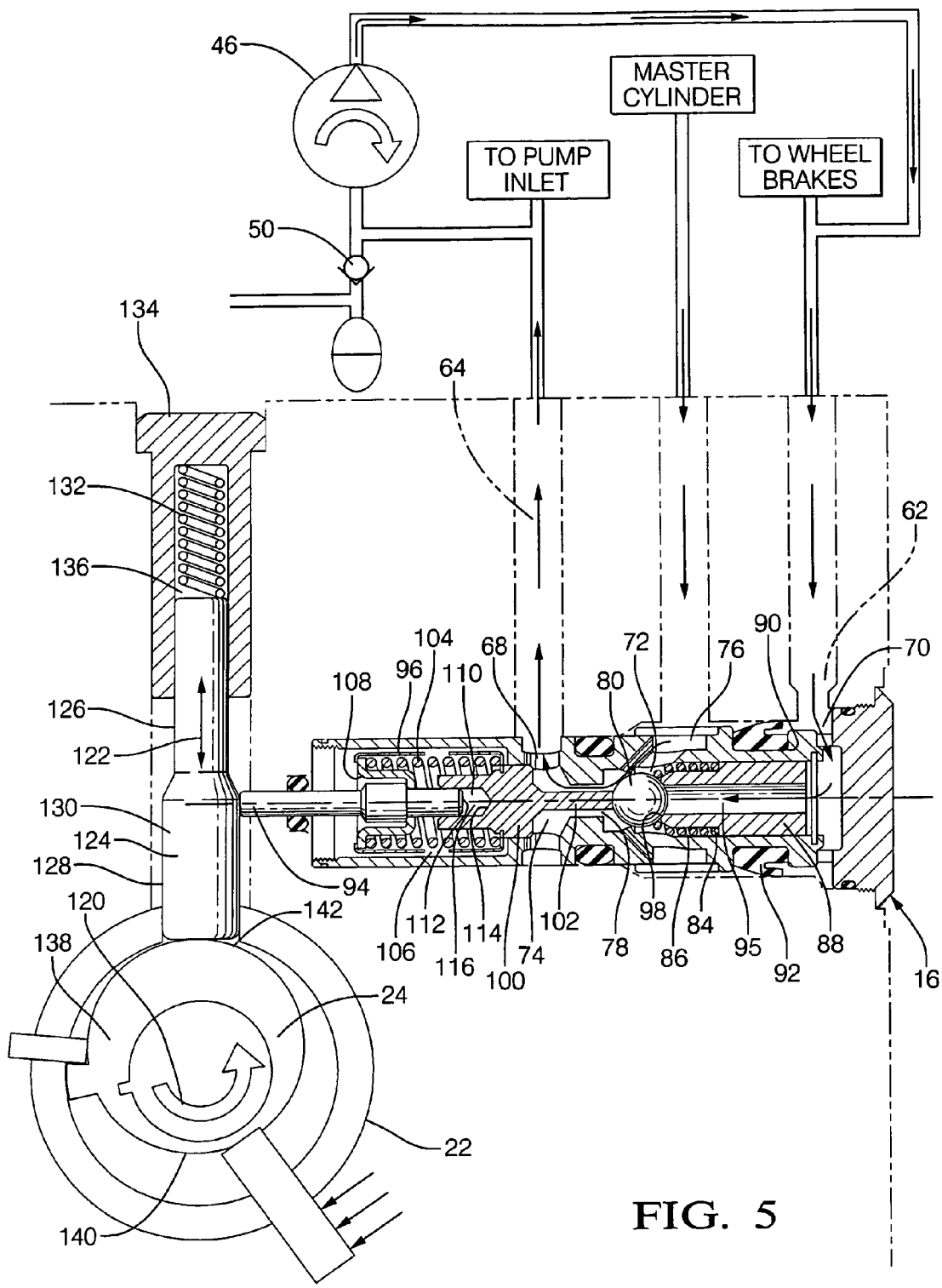

As shown in FIG. 5, with the actuator pin 94 and the spring cage assembly 96 in the extended position, the sealing member 80 is biased against a second valve seat 98 formed by the inner bore member 88 to seal the aperture 95 that, in the above-described pressure modulation mode, allows communication between the inlet 62 of the primary braking circuit 32a (FIG. 2) and the primary bore 72. The sealing member 80 preferably is biased by a biasing member 100 having an elongated portion 102 sized to extend through the passageway 78 and contact the sealing member 80. A secondary spring 104 applies a biasing force against the biasing member 100 and is disposed within an outer cage member 106 and a connecting member 108 that attaches the spring cage assembly 96 to the actuator pin 94. To maintain sealing of the aperture while in pressure build mode 14, the secondary spring 104 may have an axial spring force that is greater than the axial spring force of the primary spring 84.

A gap 110 is formed between an end 112 of the actuator pin 94 and an end 114 of a cavity 116 sized to receive the actuator pin end. This gap 110 allows transfer of the force from secondary spring 104 to the biasing member 100 (along with the sealing member 80) without bottoming to provide the necessary sealing force of biasing member 80 against the second valve seat 98. Additional deflection of the sealing and biasing members 80, 100 occurs when pressure against the biasing member from hydraulic fluid entering the combination valve 16 through the third port 76 from the primary braking circuit 32a in combination with the force of the primary spring 84 is greater than the axial spring force applied to the sealing member 80 by the secondary spring 104. This provides the pressure release for the primary braking circuit 32a when pressure within the primary braking circuit exceeds a predetermined level (e.g., from about 1000 psi or greater, such as about 1200 psi) by allowing hydraulic fluid to flow from the primary braking circuit toward the master cylinder 28. (See FIG. 2)

Referring now to FIGS. 3-5, as noted above, the actuator pin 94 is moved between retracted and extended positions using motor 18 and mechanical connection 20 connecting the actuator pin 94 and the motor 18. The mechanical connection 20 between the motor 18 and combination valve includes mechanical linkages 26, cam 24, and clutch assembly 22 that convert rotational output of the motor 18 (arrow 120) into linear motion (arrow 122) used to actuate the combination valve 16.

The mechanical linkages 26 may include lift pin 124 having a relatively narrow portion 126, a relatively wide portion 128 and a necked-down portion 130 providing a transition between the portions 126, 128 along which the actuator pin 94 can travel. The narrow portion 126 is received within a cavity 132 formed by a spring housing 134. A return spring 136 is disposed within the cavity 132 and biases the lift pin 124 in a direction toward the cam's surface 138 to maintain contact between the lift pin and cam surface 138 as the cam 24 rotates.

At an initial (or zero) position, illustrated in FIGS. 3 and 4, the lift pin 124 is in contact with a region 140 of the cam surface 138 having lesser radius from the cam's axis of rotation (see FIG. 4) (compared to region 142 having greater radius from the cam's axis of rotation (see FIG. 5), which places the actuator pin 94 in contact with the narrow portion 126 of the lift pin due to the biasing force transferred to the actuator pin 94 through the sealing member 80, biasing member 100 and spring cage assembly 96. As described above, in this position, the sealing member 80 is biased against the first valve seat 82 and the braking system 10 is in the pressure modulation mode 12 (FIG. 1). To extend the actuator pin 94, the cam 24 is rotated 180° to the pressure build mode 14 shown by FIG. 5 (see also FIG. 1). As the cam 24 rotates, the lift pin 124 moves in a direction away from the cam's axis of rotation, due to the eccentric contour of the cam surface 138, and the actuator pin 94 slidingly travels along the necked-down portion 130 of the lift pin.

In some embodiments, the cam may rotate within other ranges of less than 360°. These embodiments may include cam rotation between the initial (or zero) position and 90°, between the initial position and 270° and the like.

Referring now to FIG. 5, cam 24 is rotated 180° counter-clockwise from the initial position shown in FIG. 4, such that the lift pin 124 contacts the region 142 of greater radial dimension, which locates narrow portion 126 a greater distance within the cavity 132 and places actuator pin 94 in contact with wide portion 128 of the lift pin. As described above, in this position, the sealing member 80 is biased against the second valve seat 98 and the braking system 10 is in the pressure build mode 14 (FIG. 1). To retract the actuator pin 94, the cam 24 is rotated 180° clockwise to the position shown in FIG. 4. As the cam 24 rotates, the lift pin 124 moves in a direction toward the cam's axis of rotation, due to the eccentric contour of the cam surface 138, and the actuator pin 94 cams against the necked-down portion 130 of the lift pin.

Figure 6:
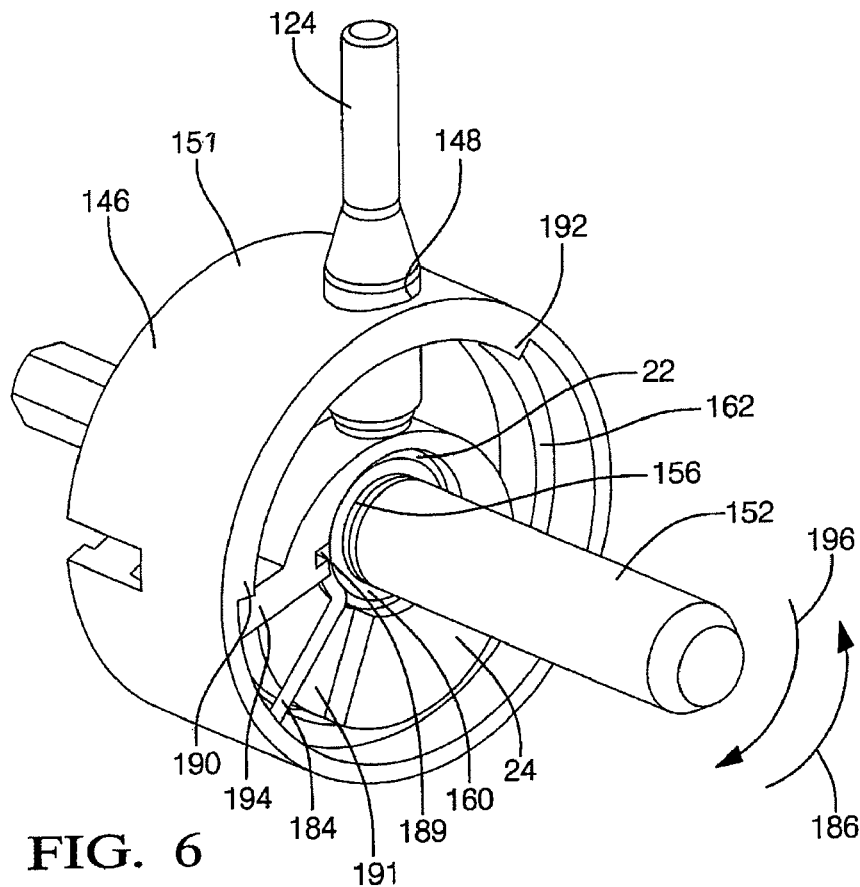
FIG. 6 is a perspective view of an embodiment of a slip clutch assembly of the present invention.

Referring to FIG. 6, the cam 24 preferably is connected to the motor 18 (FIG. 2) by slip clutch assembly 22. The slip clutch assembly 22 allows for controlled rotation of the cam 24 and also provides a fail safe that allows the braking system 10 to return to pressure modulation mode 12 (FIG. 1) in the event of motor 18 failure (e.g., motor stoppage) while in pressure build mode 14, e.g., to allow for a user-initiated braking operation.

Referring to FIGS. 6-9, slip clutch assembly 22 and cam 24 preferably are housed within a guide bushing 146 having an opening 148 extending through a guide wall 151. The opening 148 is sized to receive the lift pin 124 and the guide wall 151 provides a guide surface 162 within which the slip clutch assembly 22 can rotate. Slip clutch assembly 22 includes a clutch main shaft 152 for connection to a motor shaft 150 (e.g., using a hex driver), an inertial driver member 154 for coupling the clutch main shaft 152 to an inertial driven member 156, a lift cam torsion spring 158 connected to the cam 24 and an extension spring 160 capable of coupling the cam 24 and the inertial driven member 156. A washer 163 and retainer clip 165 may be employed to help retain the axial position of the components on the clutch main shaft 152.

Figure 7:
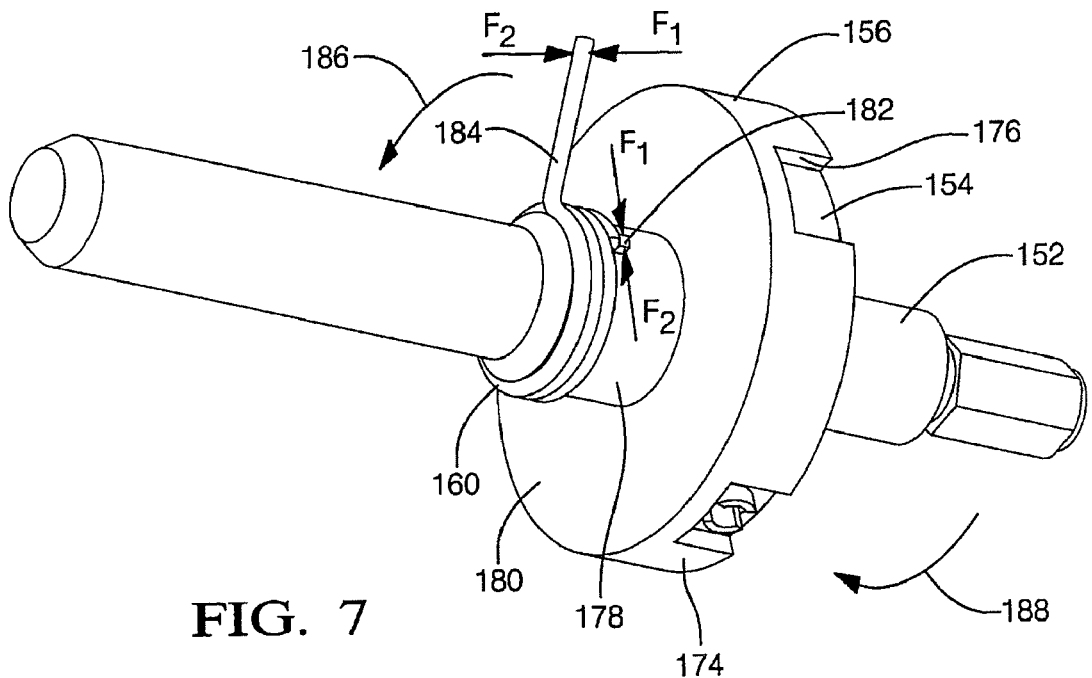

Referring to FIGS. 7-9, the inertial driver member 154 is fixed (e.g., splined) to the clutch main shaft 152, while each of the cam 24, inertial driven member 156, lift cam torsion spring 158 and extension spring 160 can rotate about the clutch main shaft 152. The inertial driver member 154 has a recess 164 sized to receive a moveable latch piston 166 that can extend outwardly from the inertial driver member's periphery when the inertial driver member rotates at or above a predetermined rate, e.g., greater than 1000 RPM. The latch piston 166 is spring biased by a return spring 170 toward a base of the recess 164 such that when rotation of the inertial driver member slows below the predetermined rate, the latch piston retracts below the inertial driver member's periphery. A retainer 173 detains return spring 170 and latch piston 166 within the recess 164.

The inertial driven member 156 includes an outer wall 174 forming an opening 172 that is sized to receive the inertial driver member 154 with the outer wall extending about the outer wall's periphery. The outer wall 174 includes notches 176 disposed about the periphery of the inertial driven member 156 and sized and positioned to engage the latch piston 166 when extending outwardly from the recess 164, which, in turn, couples the inertial driver and driven members 154, 156 and causes the inertial driven member to rotate with the inertial driver member.

Extension spring 160 is capable of coupling (and decoupling) the inertial driven member 156 and the cam 24. Referring particularly to FIG. 7, extension spring 160 (e.g., having a round cross section, a rectangular cross section, or the like) is disposed about a shaft 178 extending integrally from a rear surface 180 of the inertial driven member 156. Extension spring 160 has an initial slight interference fit between the expansion spring 160 inside diameter and shaft 178 outside diameter. Extension spring 160 includes a locking tab 182 at one end of the extension spring 160 and an unlocking tab 184 at an opposite end of the extension spring 160.

Upon application of a locking force $F_1$ to the locking tab 182 and/or the unlocking tab 184, the extension spring 160 tightens against and engages the shaft 178 of the inertial driven member 156. The locking force may also be applied by rotation of the inertial driven member 156 in the direction of arrow 186. Upon application of an unlocking force $F_2$ to the locking tab 182 and/or the unlocking tab 184, the extension spring 160 can loosen to disengage the shaft 178 of the inertial driven member 156, allowing the extension spring 160 and the inertial driven member 156 to rotate relative to each other. The unlocking force may also be applied by rotation of the inertial driven member in the direction of arrow 188.

Referring back to FIG. 6, when assembled, the locking tab 182 is located in a retention slot 189 formed in the cam 24 and the unlocking tab 184 extends alongside a side surface 191 of the cam. The guide bushing 146 includes a pair of stops 190, 192 that are located to limit rotation of the cam 24. The stops 190 and 192 are positioned to engage an extension 194 extending outwardly from the cam 24 and/or the unlocking tab 184 to apply a locking and/or unlocking force to the extension spring 160.

FIG. 6 illustrates the cam assembly 22 with the brake system 10 in pressure modulation mode 12 (FIG. 1). In this mode, the clutch main shaft 152 rotates in the direction of arrow 196 applying an unlocking force to the extension spring 160, which allows the inertial driven member 156 to rotate relative to the extension spring and cam 24 connected thereto. The size of extension spring 160 and rotation of clutch main shaft 152 is such that the cam 24 remains in the illustrated position, e.g., until the motor 18 is reversed.

Reversing the motor 18 (FIG. 2) causes the clutch main shaft 152 to rotate in the direction of arrow 186. Rotation of the clutch main shaft 152 in this direction applies a locking force to the extension spring 160, which causes the extension spring to engage the shaft 178 of the inertial driven member 156. The cam 24 rotates with the inertial driven member 156 until the unlocking tab 184 engages stop 192. The stop 192 applies an unlocking force to the extension spring 160 that allows the inertial driven member 156 to "slip" within the extension spring and rotate relative to the cam 24, while maintaining the rotated position of the cam 24.

Figure 10:
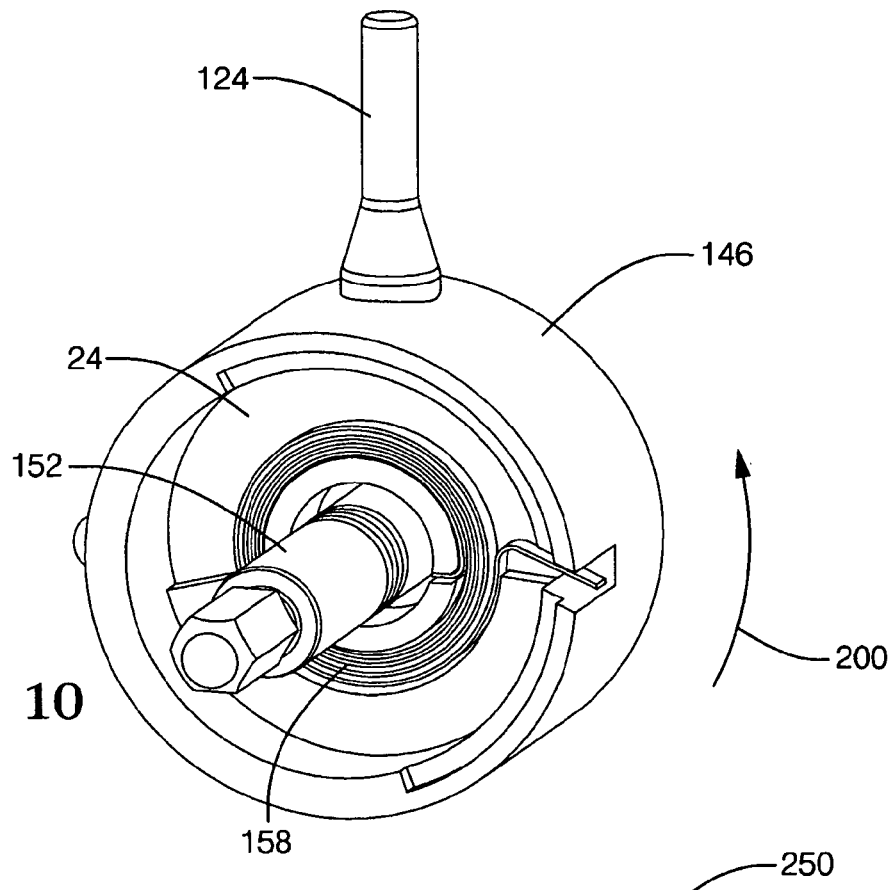
FIG. 10 is a detail perspective view of parts of the slip clutch assembly of FIG. 6 showing an embodiment of a torsion spring connected to a cam and a guide bushing.

The cam assembly 22 is provided with failsafe structure such that, should the motor 18 fail while in pressure build mode 14, the cam 24 will rotate to allow for activation of the pressure modulation mode (see FIG. 6). As shown in FIG. 10, the lift cam torsion spring 158 is operatively connected to the cam 24 and the guide bushing 146. The lift cam torsion spring 158 has one end connected to the cam 24 and the other, opposite end connected to the guide bushing 146. The torsion spring 158 applies a biasing force to the cam 24 to cause the cam to rotate in the direction of arrow 200 (i.e., toward a position to activate the pressure modulation mode 12) in the event that the clutch main shaft 152 slows below the predetermined rate. Disengagement of the inertial driver and driven members 154, 156 by retraction of the latch piston 166, as described above with reference to FIGS. 7 and 8, allows the cam 24 to rotate relative to the stalled main clutch shaft 152.

The motor 18 (FIG. 2) runs continuously regardless of whether the braking system 10 is in pressure modulation mode 12 or pressure build mode 14 (FIG. 1). As noted above, the motor 18 also drives the pump 46 using the eccentric pump actuation member 204 (FIGS. 3 and 9). Due to the eccentric outer surface of the eccentric pump actuation member 204, the pump 46 is also active in either of the two modes 12, 14, however, once the accumulator 52 is emptied (see FIG. 2), the pump 46, in some embodiments, does not receive any additional hydraulic fluid from the master cylinder 28. In certain embodiments, the pump 46 is a piston-type pump including a clearance volume when the pump's piston (not shown) is fully extended so that there is an amount of hydraulic fluid remaining in the pump to lubricate the pump while the braking system 10 is in the pressure modulation mode 12.

In some embodiments, molded reinforced plastics may be used to fabricate guide bushing 146 and cam 24. Inertial driver member 154 and the internal bushing in eccentric pump actuator member 204 can be formed with a powder metal. A cold heading process can be utilized for manufacturing inertial driven member 156, latch piston 166 and latch pin 124. Any suitable material and process can be utilized to form the components linking the motor 18 to the combination valves 16. Forming the above-described components from low cost materials using low cost, high volume processes can, in some cases, advantageously provide relatively low cost components, which can reduce the cost of the braking system 10.

Figure 11:
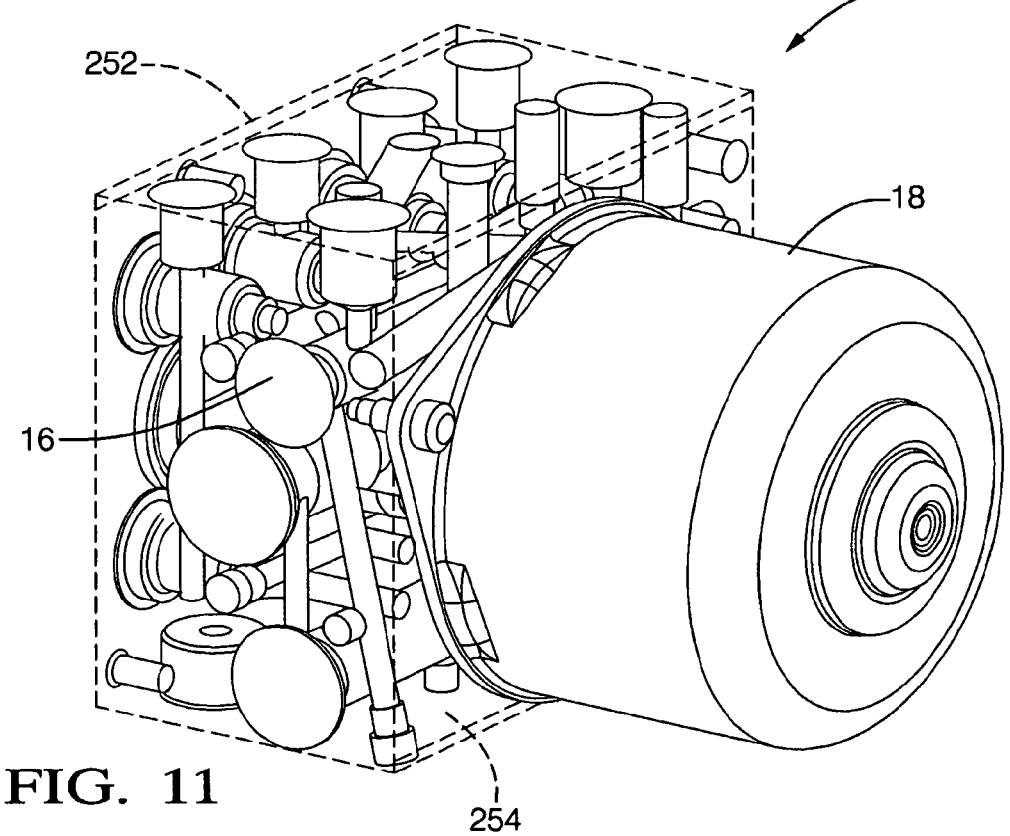
FIG. 11 is a perspective view of an embodiment of a hydraulic control unit in which the housing is in phantom.
Figure 12:
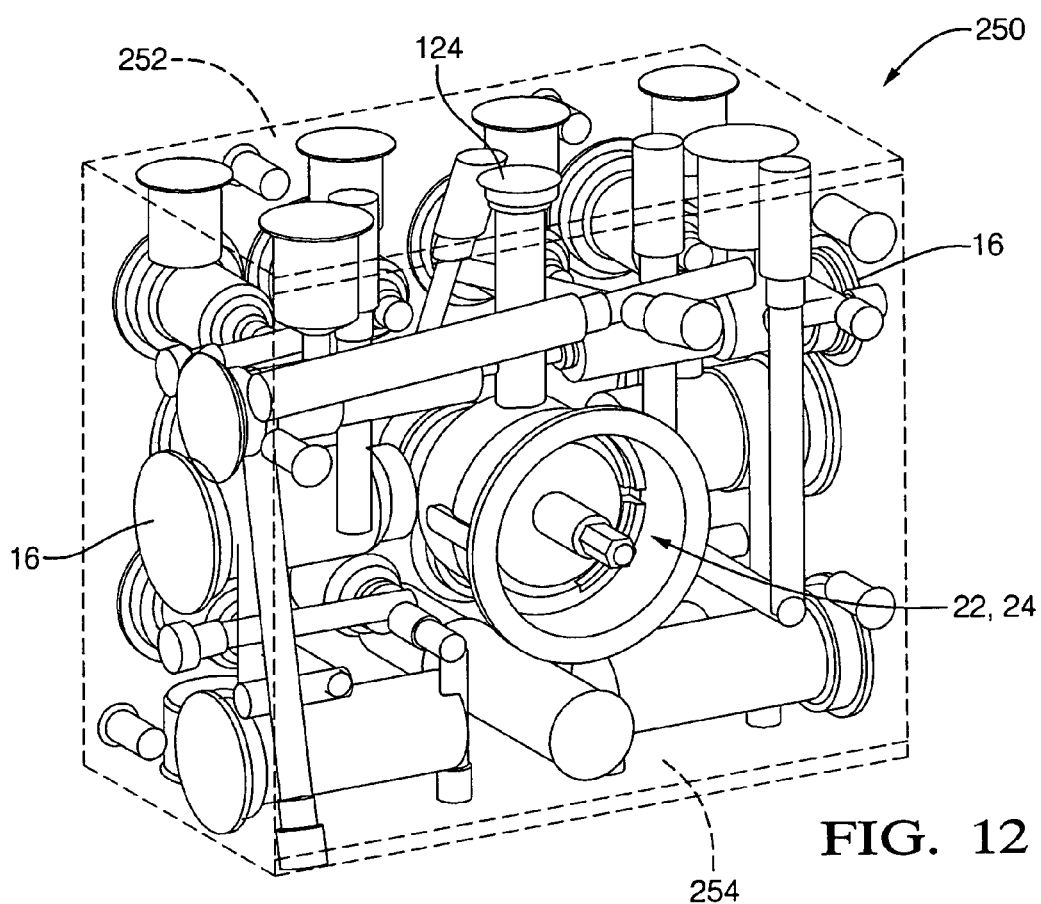
FIG. 12 is a perspective view of the hydraulic control unit of FIG. 11 with the motor removed and the housing in phantom.

Referring to FIGS. 11 and 12, a hydraulic control unit 250 (HCU) includes housing 252 (shown in phantom), e.g., that houses components generally described with reference to FIG. 1, including clutch/cam assembly 22, 24 with lift pin 124 and mechanical combination valve 16. As shown, motor 18 is mounted on an outside surface 254 of the housing.

Figure 13:
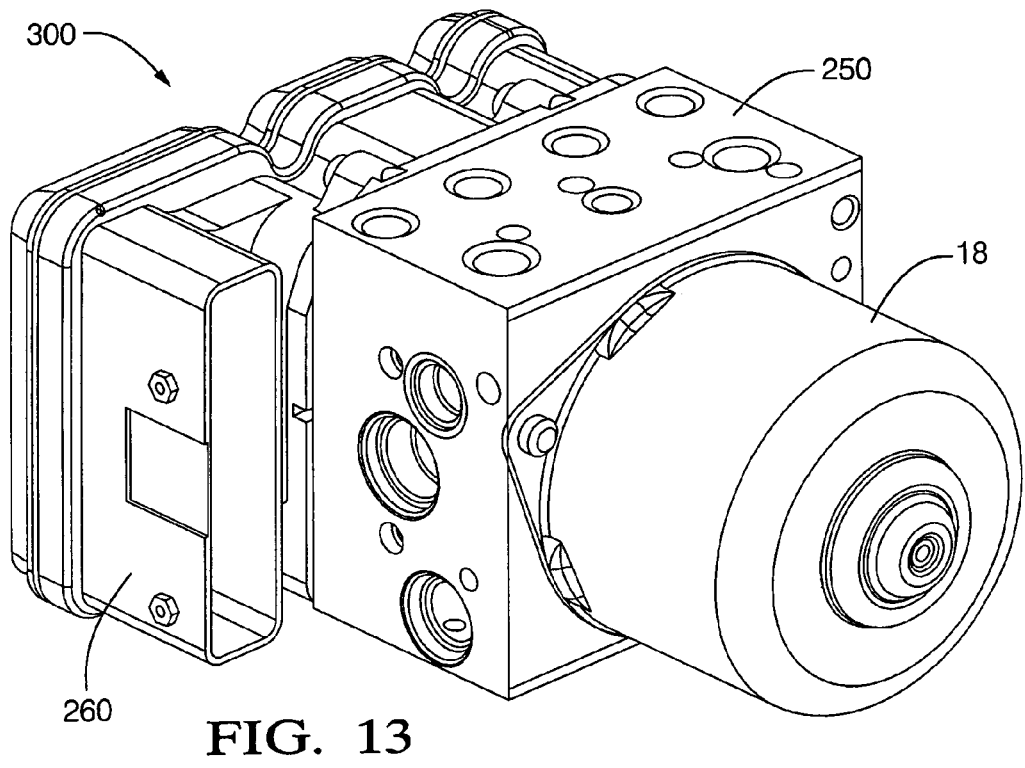
FIG. 13 is a perspective view of the hydraulic control unit of FIG. 11 with an electronic control unit connected thereto.

Referring now to FIG. 13, the HCU 250 can be electrically coupled to the electronic control unit 260 (ECU) to form an electro-hydraulic control unit 300 (EHCU). The ECU 260 electrically controls opening and closing of the inlet and outlet control valves 40, 42 and the activation, deactivation and reversal of motor 18 (see FIG. 2).

The hydraulic control system 10 eliminates use of separate prime and isolation valves, frequently employed by conventional systems, by combining the prime and isolation valves into a single mechanical combination valve. This combination of the prime and isolation valves into a single valve can serve to reduce costs and simplify and communize both the hydraulic and electronic control units. The hydraulic control system 10 uses motor reversal of the braking pump motor to actuate the mechanical combination valve. Motor speed control can be utilized to, in some cases, improve system comfort and/or reduce noise levels compared to conventional control systems. Because the prime and isolation valves are combined, the hydraulic control system 10, in some embodiments may utilize fewer solenoid valves (e.g., eight solenoid valves) compared to conventional systems that utilize more than eight solenoid valves (e.g., twelve solenoid valves).

Figure 14:
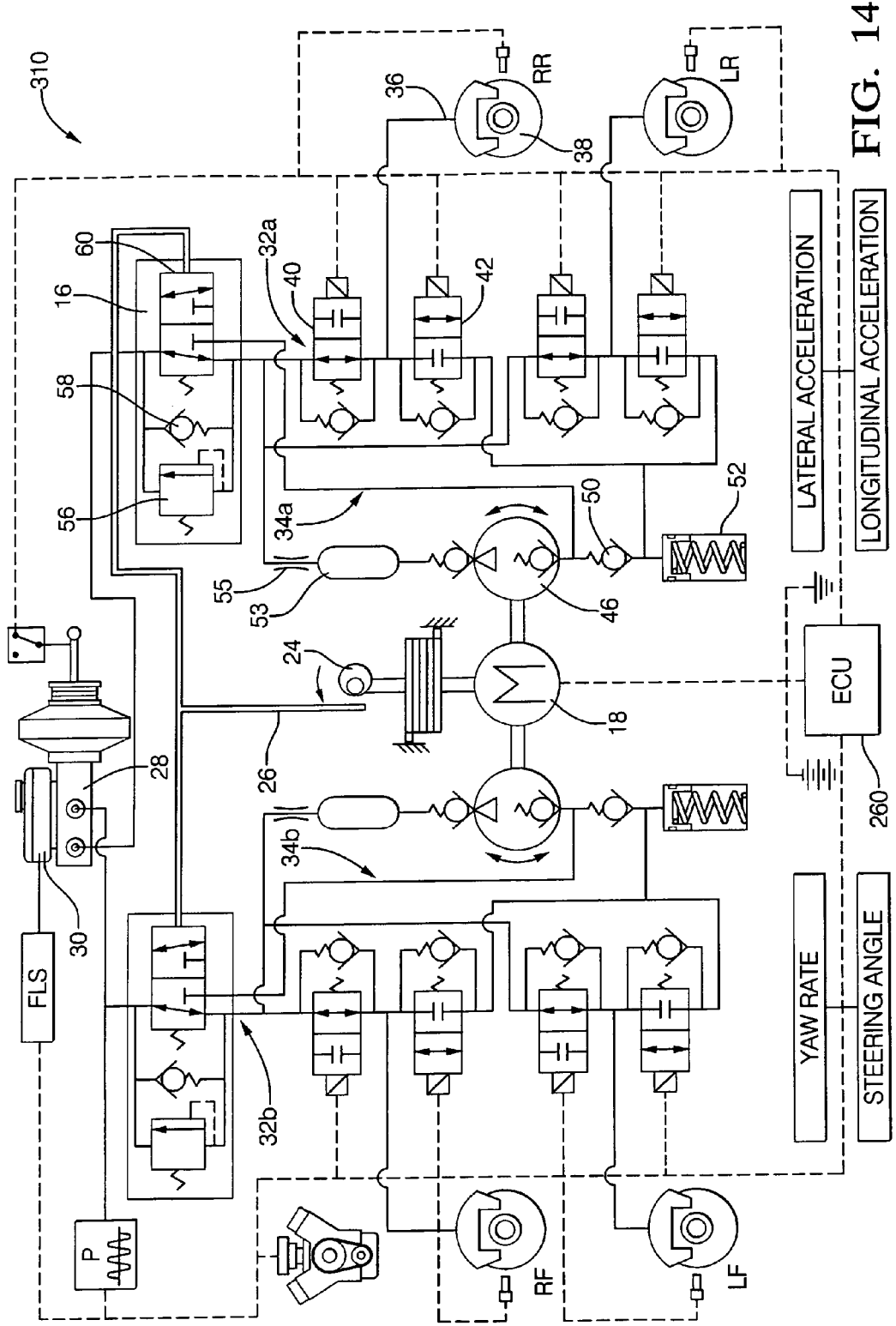
FIG. 14 is a schematic view of another embodiment of a control system of the present invention having a front/rear split configuration of the present invention.

A number of detailed embodiments have been described. Nevertheless, it will be understood that various modifications may be made. For example, referring to FIG. 14, the above-described mechanical combination valve assembly 16 can be used in a front-rear hydraulic split braking system 310, e.g., having pressure build and pressure modulation modes. The combination valve 16 can be positioned to the differing configurations for energizing the modes by reversible motor 18 operatively connected to the combination valve. Mechanical connections interconnecting the motor 18 and the combination valve 16 may include clutch assembly 22, cam 24 and mechanical linkages 26, as in the above-described diagonal split system of FIG. 2. Accordingly, other embodiments are within the scope of the following claims.

What is claimed is:

1. A hydraulic control system for a brake apparatus, the hydraulic control system comprising:
   a combination valve;
   an actuator connected to the combination valve such that output by the actuator in a first direction places the combination valve in a first configuration, and output by the actuator in a second direction opposite the first direction places the combination valve in a second configuration different from the first configuration;
   the combination valve including an actuator pin operatively connected to the actuator such that the actuator pin is retracted using the actuator to place the combination valve in the first configuration and is extended using the actuator to place the combination valve in the second configuration;
   a cam driven by the actuator and having an eccentric surface and a follower having an outer surface that engages the actuator pin, the outer surface of the follower configured to extend and retract the actuator pin as the follower is moved by the cam;
   a clutch assembly, wherein rotation of the cam is controlled, at least in part, by the clutch assembly and the clutch assembly is configured to couple the cam with the actuator such that the cam rotates within a range less than 360 degrees as an output shaft of the actuator rotates;
   a pedal-operated master cylinder; and
   a controller connected to the actuator;
   wherein, in the first configuration, the combination valve allows hydraulic fluid to flow along a first fluid path and, in the second configuration, the combination valve allows hydraulic fluid to flow along a second fluid path different from the first fluid path;
   wherein the first fluid path forms part of a pressure modulation circuit and the second fluid path forms part of a pressure build circuit;
   wherein the controller controls the actuator to place the combination valve in the second configuration to increase braking pressure to initiate a controlled braking operation independent of user actuation of the pedal-operated master cylinder.

2. The hydraulic control system of claim 1 wherein the actuator is operatively connected to a braking pump.

3. The hydraulic control system of claim 2 wherein the actuator drives the braking pump in each of the first and second directions.

4. The hydraulic control system of claim 1 wherein the clutch assembly includes
   a clutch shaft connected to the actuator;
   a driven member having an aperture through which the clutch shaft extends; and
   a driver member integrally connected to the clutch shaft, the driver member including a latch piston configured to extend from a periphery of the driver member and couple the driven member to the driver member.

5. The hydraulic control system of claim 4 wherein the clutch assembly includes an extension spring configured to releasably couple the cam to the driven member to allow rotation of the cam from an initial angular position, associated with the first configuration of the mechanical actuation valve, to a different, second angular position associated with the second configuration of the combination valve only when the output of the actuator changes directions.

6. The hydraulic control system of claim 1 wherein the combination valve connects the pressure modulation circuit and the pressure build circuit to the pedal-operated master cylinder.

7. A hydraulic control system for a brake apparatus, the hydraulic control system comprising:
   a combination valve;
   a motor mechanically connected to the combination valve for positioning the combination valve between a first configuration and a second configuration different from the first configuration, the motor positions the combination valve from the first configuration to the second configuration only upon a change in output direction of the motor, the position of the combination valve remaining unchanged until a change in output direction of the motor;
   a braking pump operatively connected to the motor for driving the braking pump;
   a cam and follower assembly, wherein the motor is mechanically coupled to the combination valve using the cam and follower assembly; and
   a clutch assembly, wherein the motor includes an output shaft and the cam and follower assembly includes a cam, wherein rotation of the cam is controlled, at least in part, by the clutch assembly and the clutch assembly is configured to releasably couple the cam with the output shaft such that the cam rotates with the output shaft;
   wherein, in the first configuration, the combination valve allows hydraulic fluid to flow along a first fluid path for a pedal-initiated braking operation, and in the second configuration, the combination valve allows hydraulic fluid to flow along a second fluid path toward the pump, the second fluid path being different from the first fluid path;
   wherein, with the combination valve in the second configuration, the pump increases braking pressure to the brake apparatus to initiate a controlled braking operation without user actuation of a brake pedal.

8. The hydraulic control system of claim 7 wherein the motor is reversible between a first output direction and a second output direction opposite the first output direction, the braking pump being driven by the motor in each of the first and second output directions.

9. The hydraulic control system of claim 8 further comprising the output shaft operatively connected to the combination valve, wherein the motor is configured to rotate the output shaft such that with the output shaft rotating in a first direction, the combination valve is placed in the first configuration, and with the output shaft rotating in a second direction opposite the first direction, the combination valve is placed in the second configuration different from the first configuration.

10. The hydraulic control system of claim 7 wherein the combination valve includes an actuator pin mounted to be retracted by the motor thereby placing the combination valve in the first configuration, and extended, thereby placing the combination valve in the second configuration.

11. The hydraulic control system of claim 7 wherein the clutch assembly allows the cam to rotate between about 0° and about 180°.

12. A method of controlling a braking apparatus having a pressure modulation mode and a pressure build mode comprising the steps of:

linking a reversible motor to a mechanical combination valve using a cam and follower assembly, wherein the motor is mechanically coupled to the mechanical combination valve using the cam and follower assembly, wherein the motor includes an output shaft and the cam and follower assembly includes a cam, wherein rotation of the cam is controlled, at least in part, by a clutch assembly and the clutch assembly is configured to releasably couple the cam with the output shaft such that the cam rotates with the output shaft; and providing an electronically initiated braking operation independent of brake pedal operation by actuating the mechanical combination valve using the reversible motor from a first configuration associated with a first motor output direction to a second configuration associated with a second motor output direction opposite the first motor output direction, the second configuration being different than the first configuration, the reversal of the motor being controlled by a controller independent of brake pedal operation whereby braking pressure is increased to the braking apparatus providing a controlled braking operation;

once the mechanical combination valve is in at least one of the first configuration and the second configuration, the mechanical combination valve being moved by the reversible motor only upon a change in the motor output direction.

13. The method of claim 12 further comprising the step of switching hydraulic fluid flow from a first fluid path with the mechanical combination valve in the first configuration to a second fluid path different from the first fluid path with the mechanical combination valve in the second configuration.

14. The method of claim 12 further comprising the step of linking a pump to the reversible motor such that the reversible motor drives the pump in each of the first and second output directions.

* * * * *